No. 892,852.
PATENTED JULY 7, 1908.
A. KLEIN.
FASTENER FOR FURS.
APPLICATION FILED JAN. 16, 1908.
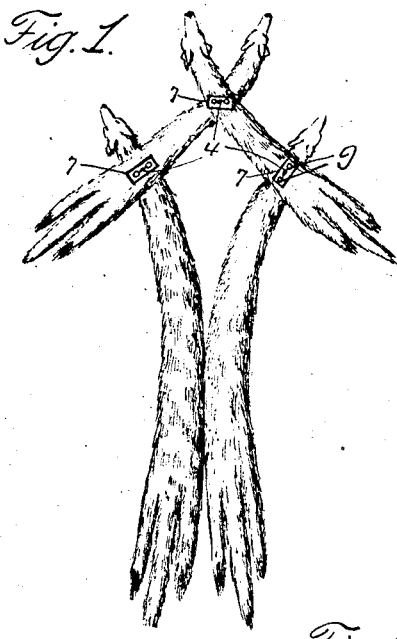
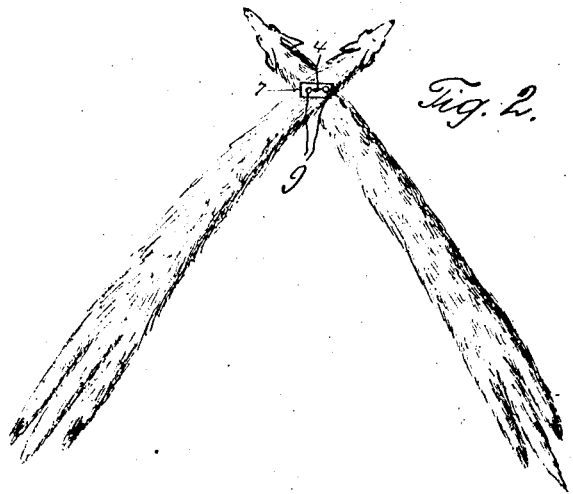
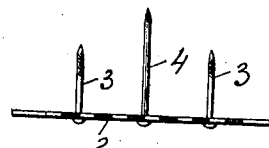
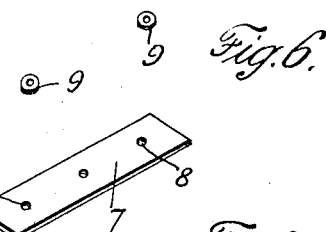
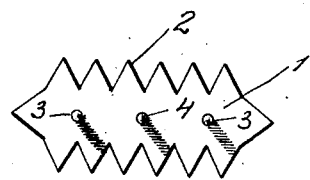
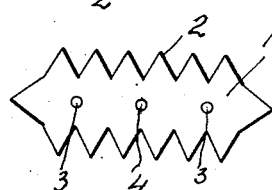
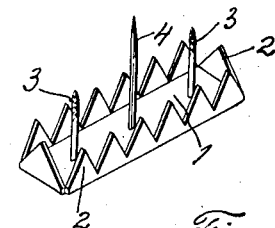
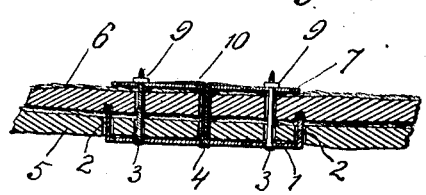
Inventor
A. KLEIN,
Witnesses

UNITED STATES PATENT OFFICE.

ADOLPHE KLEIN, OF PITTSBURG, PENNSYLVANIA.

FASTENER FOR FURS.

No. 892,852.

Specification of Letters Patent.

Patented July 7, 1908.

Application filed January 16, 1908. Serial No. 411,062.

*To all whom it may concern:*

Be it known that I, ADOLPHE KLEIN, a subject of the King of Hungary, residing at North Side Pittsburg, in the county of Allegheny and State of Pennsylvania, have invented certain new and useful Improvements in Fasteners for Furs, of which the following is a specification, reference being had therein to the accompanying drawing.

This invention relates to fasteners for furs, and the objects of the invention are, to provide a novel fastener for securing furs together of an intricate design, particularly those of a tortile configuration; second, to provide a novel fastener which will not injure the furs connected together, but will firmly and strongly hold the same; and third, to provide a fastener of a simple, durable and inexpensive construction. I attain these objects by a structure that will be presently described, and then specifically pointed out in the appended claims.

Referring to the drawings forming a part of this specification, Figure 1 is an elevation of a fur comprising four parts secured together by my fastener, Fig. 2 is a similar view of a fur comprising two parts secured together by one of my fasteners, Fig. 3 is a plan of a piece of metal from which my fastener is formed, Fig. 4 is an edge view of the same, Fig. 5 is a bottom plan view of the same, Fig. 6 is a perspective view of a locking plate used in connection with the fastener and the nuts for securing the same, Fig. 7 is a perspective view of the fastener proper, and Fig. 8 is a longitudinal sectional view of the fastener, as holding two pieces of fur together.

To put my invention into practice I provide a thin metal plate 1 having its edges scalloped or cut to form a plurality of prongs 2, adapted to be bent upwardly at right angles to the plate as illustrated in Figs. 7 and 8 of the drawings. The plate 1 is then pierced to accommodate two pointed bolts 3 and a bifurcated pin 4, the bolts being arranged near the ends of the plate and the pin 4 intermediate said bolts. The bolts 3 and the pin 4 are both pointed at their free ends, so as to facilitate their penetrating the furs to which the device is to be attached.

The fastener is now ready to be inserted in the skin 5 of one fur, the prongs 2 engaging in said skin, while the bolts 3 and the pin 4 pierce the skin 6 of another fur. A locking plate 7 is now placed over the bolts 3 and the pin 4, this plate being pierced as at 8, to receive the bolts and pin, and nuts 9 are then screwed upon the bolts to hold the plate 7 in engagement with the skin 6. The bifurcated pin 4 is then split, as at 10, whereby the pin will assist in holding the fastener in position. This pin facilitates the operation of placing the fastener in engagement with two furs, as the pin is first bent or clenched to hold the plate 7, whereby the nuts 9 can be screwed upon the bolts 3.

My fastener is small in size, and occupies a comparatively small space upon a fur.

The fastener will be practically invisible, and permits of two or more piece furs being disassembled.

Having now described my invention what I claim as new, is:—

1. A fastener of the type described comprising a metallic plate having its edges cut to provide a plurality of upwardly extending prongs, bolts mounted in said plate, a bifurcated pin mounted in said plate intermediate said bolts, a locking plate adapted to fit upon said bolts and pin, and nuts for retaining said plate upon said bolts, substantially as described.

2. A fastener of the type described comprising a scalloped plate having its edges bent upwardly, bolts carried by said plate, a locking plate adapted to fit upon said bolts, a bifurcated pin carried by the first mentioned plate and adapted to have its end bent to retain said locking plate upon said bolts, and nuts screwed upon said bolts.

3. A fastener of the type described, comprising a plate provided with pointed penetrating prongs along its longitudinal edges, pointed penetrating bolts carried by said plate, a locking plate received on said bolts, and means engaging the bolts for securing the locking plate thereon.

4. The combination with furs, of a scalloped plate having its edges bent upwardly to provide prongs adapted to engage in the skin of one fur, pointed bolts carried by said scalloped plate for engaging in the skin of another fur, a locking plate mounted upon said bolts, and a pin carried by said scalloped plate, and extending through said furs for holding said locking plate in engagement with said bolts.

5. A fastener of the type described, comprising a plate provided along its longitudinal edges and at its ends with penetrating prongs projecting from the plate at right angles thereto, a pointed split pin carried by said plate, and a locking plate having an aperture to receive the said pin, the split portion of the pin being bent over on the locking plate to secure the latter in position.

6. A fastener for furs, comprising a plate provided with penetrating prongs, securing-members carried by the plate to penetrate the furs, a locking plate receiving said securing members, and means to secure said locking plate in position.

In testimony whereof I affix my signature in the presence of two witnesses.

ADOLPHE KLEIN.

Witnesses:
MAX H. SROLOVITZ,
K. H. BUTLER.